(12) United States Patent
Parrish

(10) Patent No.: US 7,492,706 B1
(45) Date of Patent: *Feb. 17, 2009

(54) FRAME SYNCHRONIZATION AND FAULT PROTECTION FOR A TELECOMMUNICATIONS DEVICE

(75) Inventor: Brent K. Parrish, Hollis, NH (US)

(73) Assignee: Cisco Technology, Inc., San Jose, CA (US)

(*) Notice: Subject to any disclaimer, the term of this patent is extended or adjusted under 35 U.S.C. 154(b) by 1172 days.

This patent is subject to a terminal disclaimer.

(21) Appl. No.: 10/740,290

(22) Filed: Dec. 18, 2003

Related U.S. Application Data

(63) Continuation of application No. 09/328,031, filed on Jun. 8, 1999, now Pat. No. 6,683,848.

(51) Int. Cl.
*H04L 12/24* (2006.01)
(52) U.S. Cl. ...................... 370/218; 370/221
(58) Field of Classification Search ......... 370/216–218, 370/221, 22, 241, 242, 244, 245, 249, 250; 714/2, 25, 47, 744
See application file for complete search history.

(56) References Cited

U.S. PATENT DOCUMENTS

| | | | |
|---|---|---|---|
| 3,752,921 A * | 8/1973 | Audretsch et al. ........... 370/203 |
| 5,059,925 A | 10/1991 | Weisbloom ................. 331/1 A |
| 5,255,291 A | 10/1993 | Holden et al. ............... 375/111 |
| 5,742,649 A | 4/1998 | Muntz et al. ................ 375/371 |
| 5,787,070 A | 7/1998 | Gupta et al. ................ 370/217 |
| 5,812,618 A | 9/1998 | Muntz et al. ................ 375/372 |
| 5,955,959 A * | 9/1999 | Taki et al. .................... 340/3.2 |
| 6,041,066 A * | 3/2000 | Meki et al. .................. 370/512 |
| 6,339,600 B1 * | 1/2002 | Hazama ..................... 370/474 |

\* cited by examiner

*Primary Examiner*—Wing F Chan
*Assistant Examiner*—Duc T Duong
(74) *Attorney, Agent, or Firm*—Baker Botts L.L.P.

(57) ABSTRACT

According to one embodiment, a telecommunications device includes a bus. A first controller coupled to the bus is operable to generate first pulses for communication using the bus. A second controller coupled to the bus is operable to generate second pulses synchronized with the first pulses for communication using the bus. A card coupled to the bus is operable to receive the first and second pulses, generate internal pulses synchronized with the first and second pulses, compare at least one internal pulse with at least one first pulse to detect a loss of synchronization, and indicate this loss of synchronization to allow the second controller to determine a failure of the first controller.

29 Claims, 6 Drawing Sheets

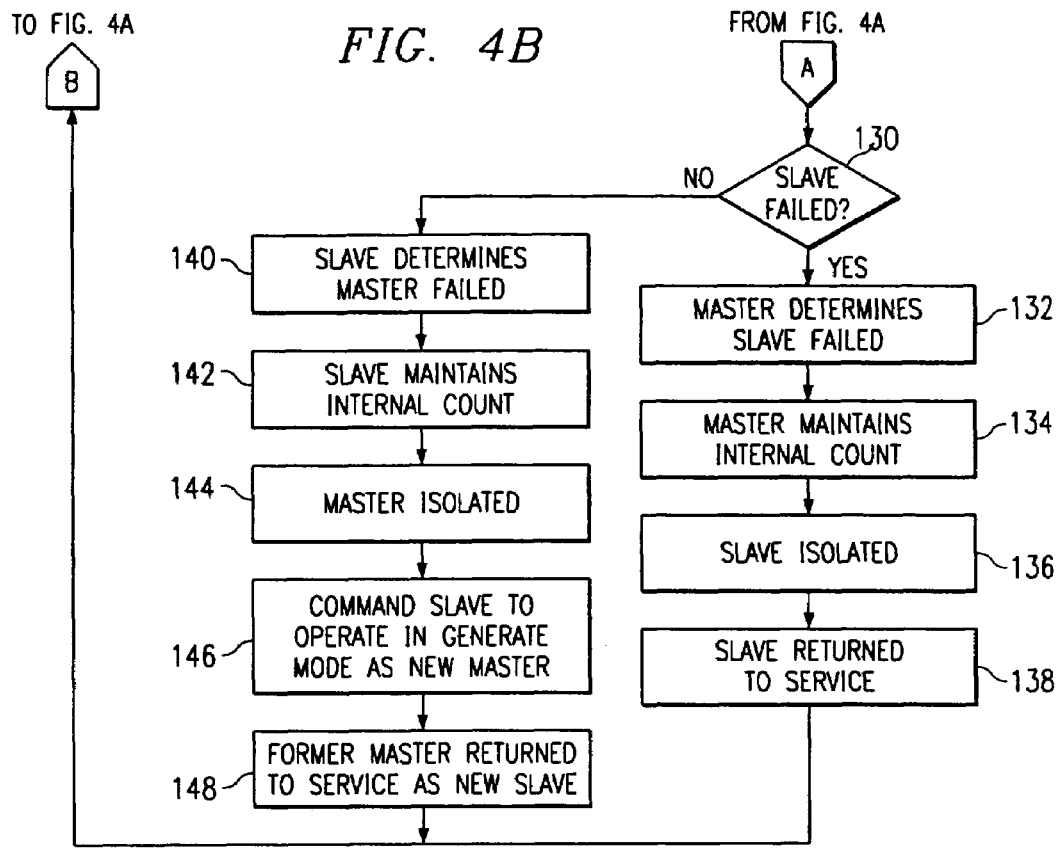
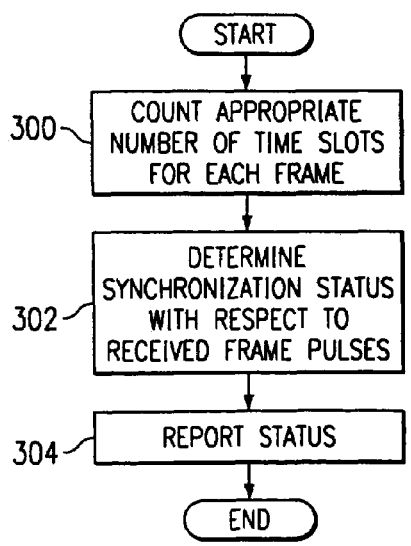

FRAME SYNCHRONIZATION AND FAULT PROTECTION FOR A TELECOMMUNICATIONS DEVICE

CROSS-REFERENCE TO RELATED APPLICATIONS

This application is a continuation of U.S. application Ser. No. 09/328,031 filed Jun. 8, 1999 now U.S. Pat. No. 6,683,848 and entitled "Frame Synchronization and Fault Protection for a Telecommunications Device".

TECHNICAL FIELD OF THE INVENTION

This invention relates generally to the field of telecommunications, and more particularly to frame synchronization and fault protection for a telecommunications device.

BACKGROUND

Many telecommunications devices include backplanes for transmitting digital information between components of the devices. For example, a telecommunications switching system might include a backplane for transmitting digital data representing voice signals between cards associated with incoming and outgoing ports. Typically, such a system would also include a mechanism to allow the system to detect a framing error or other loss of synchronization between cards, which may occur as a result of a total or partial failure of one of the cards. Successful operation of the system in many instances will depend heavily upon the ability of this mechanism to appropriately detect and respond to such a failure to meet often stringent availability, flexibility, and other requirements placed on the system.

As the telecommunications industry continues to dominate the growth of the global economy, meeting availability, flexibility, and other requirements placed on switching and other systems has become increasingly important. High availability is generally considered as exceeding 99.999 percent availability, amounting to less than approximately five minutes of "down time" per year, and generally requires a system to be able to detect and to autonomously handle certain faults, such as failure of a card causing framing errors or other losses of synchronization, without immediate human intervention. Providing high availability is often a de facto if not explicit competitive requirement for many telecommunications manufacturers.

However, previous techniques for detecting and responding to a framing error or other loss of synchronization are often inadequate to meet high availability and other requirements. One such technique involves comparing, at each card and for each frame, reference signals received from each of two signal generators to detect a framing error or other loss of synchronization between the card and one or both of the generators. If a framing error is detected, the system might raise an alarm to indicate the error, but might otherwise provide no indication of the source of the error -- one generator, both generators, or the card itself. Previous techniques also do not allow the system to continue operating, uninterrupted and maintaining the integrity of data the system is handling, despite failure of one of these components, which may result for example in dropped calls and other undesirable consequences. These and other deficiencies of previous techniques become particularly apparent within high availability backplane environments of telecommunications devices.

SUMMARY OF THE INVENTION

According to the present invention, disadvantages and problems associated with frame synchronization and fault protection in telecommunications devices may be reduced or eliminated.

According to one embodiment, a telecommunications device includes a bus. A first controller coupled to the bus is operable to generate first pulses for communication using the bus. A second controller coupled to the bus is operable to generate second pulses synchronized with the first pulses for communication using the bus. A card coupled to the bus is operable to receive the first and second pulses, generate internal pulses synchronized with the first and second pulses, compare at least one internal pulse with at least one first pulse to detect a loss of synchronization, and indicate this loss of synchronization to allow the second controller to determine a failure of the first controller.

Certain embodiments of the present invention may provide one or more important technical advantages over previous techniques for detecting and responding to framing errors or other losses of synchronization, in particular within a high availability backplane environment of a telecommunications device. Certain embodiments of the present invention provide multiple layers of fault protection, including detection, source identification, and handling of faults associated with cards within the device, helping to prevent single points of failure from propagating in the system, reduce down time, and satisfy high availability and other requirements. Unlike previous techniques, certain embodiments of the present invention use internal pulses generated at one or more cards within the system to monitor synchronization between the first controller, the second controller, and the cards. Also unlike previous techniques, rather than merely detecting a framing error or other loss of synchronization, certain embodiments of the present invention allow the source of the error to be readily identified and the error handled accordingly, protecting operation of the system from the fault responsible for the error and maintaining the integrity of data the system is handling. As a result of these and other important technical advantages, certain embodiments of the present invention are well suited for incorporation in a wide variety of switching and other modern telecommunications devices.

BRIEF DESCRIPTION OF THE DRAWINGS

To provide a more complete understanding of the present invention and certain of its features and advantages, reference is now made to the following description taken in conjunction with the accompanying drawings, in which:

FIGS. 4A and 4B are a flow chart that illustrates an example method of providing frame synchronization and associated fault protection for redundant switching unit controllers according to the present invention;

FIG. 6 is a flow chart that illustrates an example method of monitoring synchronization with a received frame pulse according to the present invention.

DESCRIPTION OF THE EXAMPLE EMBODIMENTS

Figure 1:
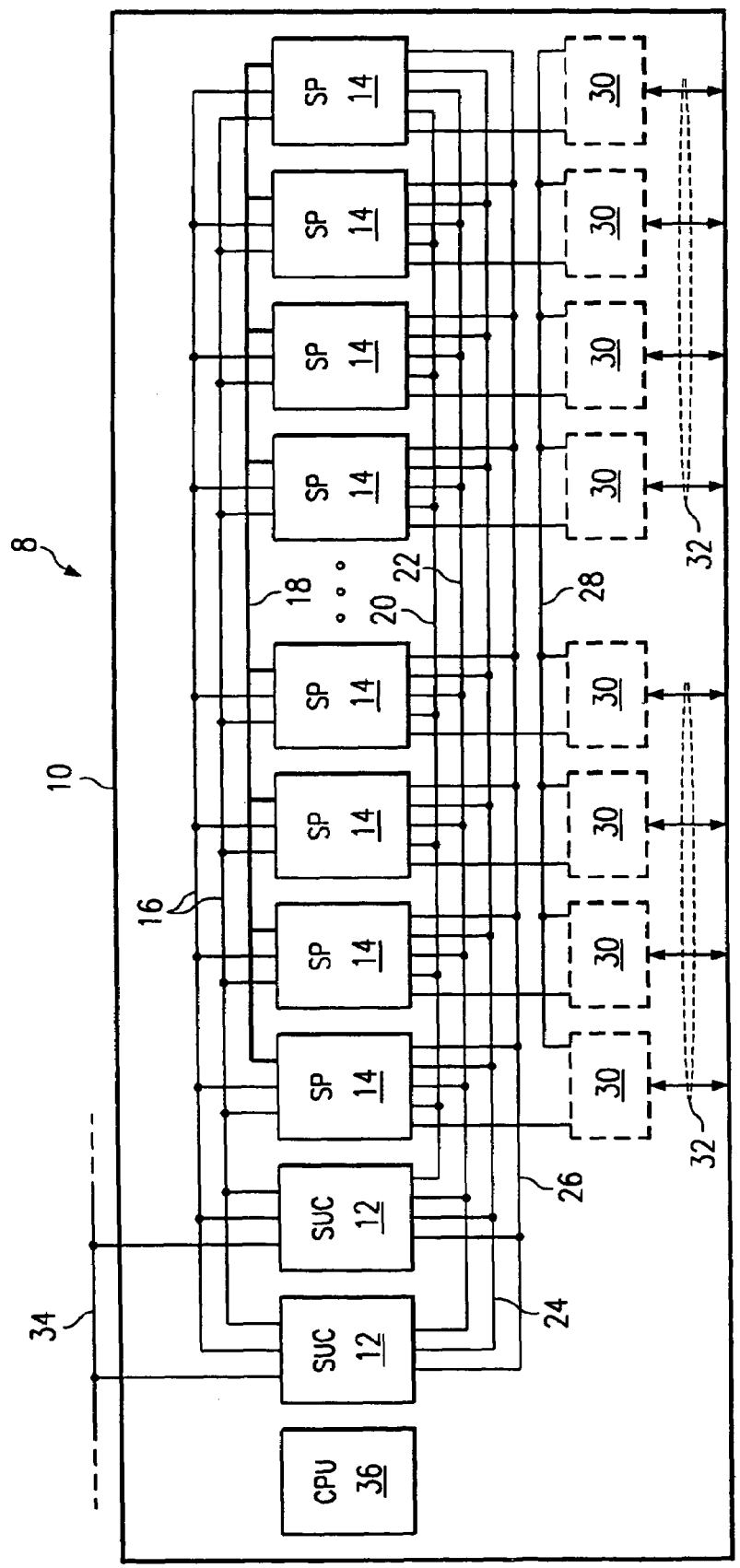
FIG. 1 illustrates an example system including at least one switching unit having a redundant synchronization bus according to the present invention.

FIG. 1 illustrates an example system 8 including one or more switching units 10. In one embodiment, each switching unit 10 is a programmable switching unit that switches time division multiplexed (TDM), packet-based, or other suitable digital signals associated with voice, data, or other appropriate traffic between incoming and outgoing ports, lines, trunks, or other suitable telecommunications network interfaces. In general, switching unit 10 may operate at least in part subject to control of suitable software within one or more associated host computers and may be coupled to such host computers using one or more suitable communications links. Although switching unit 10 is discussed, those skilled in the art appreciate that the present invention may apply similarly to a variety of other telecommunications devices and that the present invention encompasses all such applications.

In one embodiment, switching unit 10 includes two or more redundant switching unit controllers (SUC) 12 coupled to one another and to multiple service providers (SP) 14 using two or more redundant synchronization buses 16. Each switching unit controller 12 and each service provider 14 is a card supporting appropriate integrated circuits, buses, circuitry, and any other suitable electrical components and may be shelf-mounted, rack-mounted, or otherwise removably installed within switching unit 10 in accordance with particular needs. Switching unit controllers 12 generally cooperate to control selected aspects of the operation of service providers 14 and other components within switching unit 10. Service providers 14 communicate digital signals with one another using a backplane, midplane, or other switching fabric 18 that in a particular embodiment supports up to 16,384 time slots, corresponding to as many as 16,384 ports associated with switching unit 10. Service providers 14 generally communicate between backplane 18 and suitable network interfaces to allow switching unit 10 to communicate information with and to switch digital signals associated with these interfaces. Service providers 14 may communicate with network interfaces of a single or multiple types within switching unit 10, for example and not by way of limitation, T1 interfaces, E1 interfaces, Integrated Services Digital Network (ISDN) interfaces, Signaling System 7 (SS7) interfaces, Optical Carrier level-3 (OC-3), or any other suitable interfaces, in any combination. Service providers 14 may have a peer-to-peer or any suitable hierarchical relationship. Some or all switching unit controllers 12 and service providers 14 may be hot insertable, hot pluggable, hot swappable, or otherwise readily replaceable during operation of switching unit 10 to support high availability requirements.

In general, switching unit controllers 12 and service providers 14 use control bus 20 to communicate suitable command, control, and administrative messages during operation of switching unit 10. Control bus 20 and its associated physical layer protocol provide a local area network that couples switching unit controllers 12 and service providers 14 in the backplane environment of switching unit 10, which may be a high availability backplane environment. Control bus 20 and its operation are described more fully in U.S. Pat. No. 6,425,009 and copending U.S. application Ser. No. 09/328,171. In addition to control bus 20, switching unit controllers 12 and service providers 14 may be coupled to one another using a combination of power bus 22, reset bus 24, and isolation bus 26 according to particular needs.

Associated with service providers 14 are input/output (I/O) modules 30 that support incoming and outgoing communications between the service providers 14 and associated network interfaces using associated links 32. Protection bus 28 couples I/O modules 30 and generally operates in cooperation with other components of switching unit 10 to provide protection switching and other capabilities desirable in avoiding a single point of failure and satisfying high availability requirements. Protection bus 28 and selected related components are described more fully in U.S. Pat. No. 6,550,016. CPU 36 supports appropriate software and cooperates with the other components of switching unit 10 to facilitate the operation of the present invention. Where appropriate, reference to CPU 36 includes reference to some or all associated software unless otherwise indicated. Moreover, although a single CPU 36 is illustrated, CPU 36 may include multiple CPUs, microprocessors, or other suitable computers that are distributed, in whole or in part, among some or all of the cards located in switching unit 10.

One or more switching unit controllers 12 within a particular switching unit 10 may be coupled using network 34 to one or more switching unit controllers 12 within other switching units 10, one or more associated host computers, or one or more other network components, in any suitable combination. Network 34 may be a shared or dedicated local area network (LAN) supporting Ethernet or any other communications protocol, a suitable wide area network (WAN), or any other appropriate network. In one embodiment, network 34 supports a secure 100BaseT Ethernet link and one or more higher level protocols, for example, TCP/IP (Transmission Control Protocol/Internet Protocol), UDP/IP (User Datagram Protocol/Internet Protocol), or another appropriate protocol. A service provider 14 needing to communicate with a service provider 14 located in another switching unit 10 does so using one of its associated switching unit controllers 12 as a gateway to network 34. Switching unit controller 12 collects and buffers message packets from service provider 14, reformats the message packets as appropriate, and transmits the message packets to a switching unit controller 12 in the switching unit 10 associated with the destination service provider 14.

Figure 2:
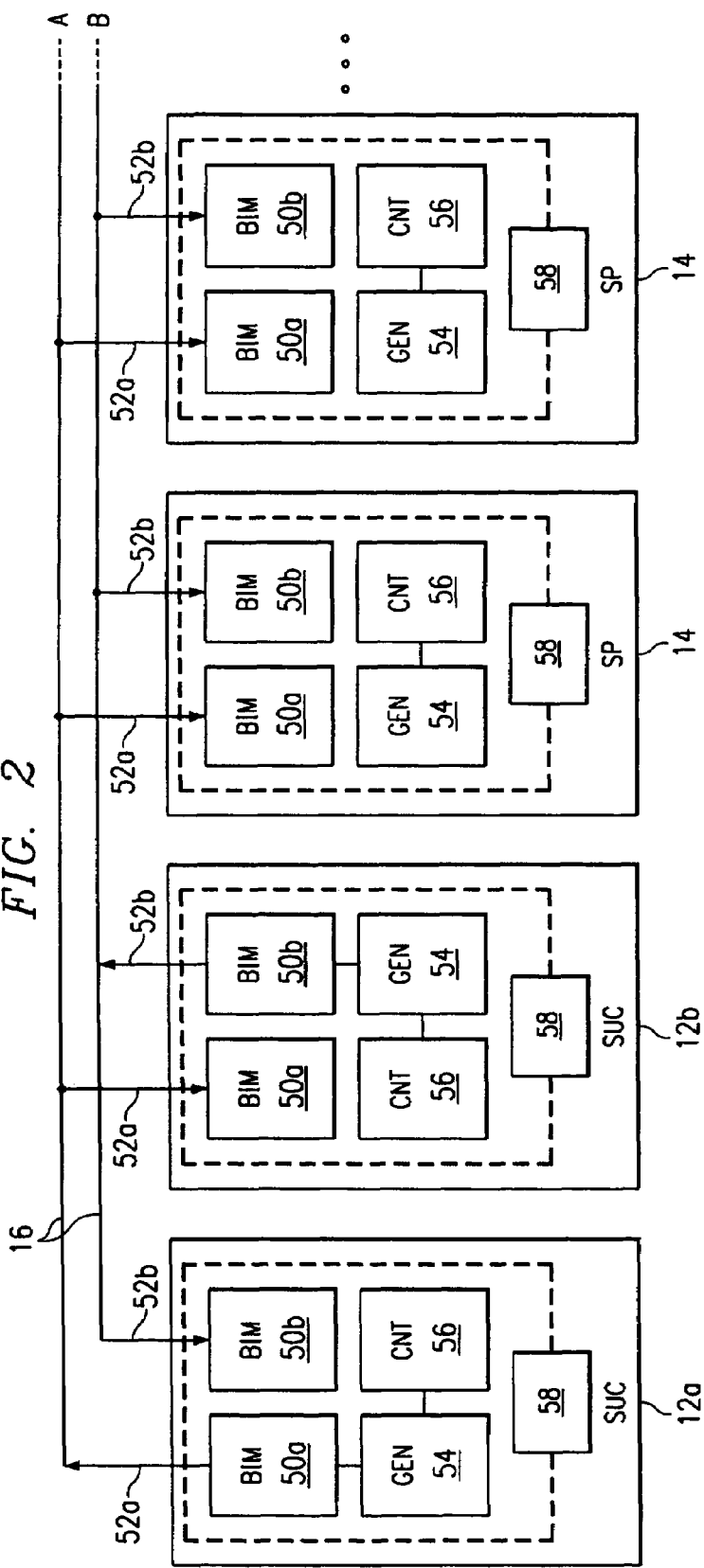
FIG. 2 illustrates in further detail an example redundant synchronization bus and selected related components within a switching unit according to the present invention.

FIG. 2 illustrates in more detail synchronization bus 16 and selected related components within switching unit 10. In general, synchronization bus 16 and related components provide frame synchronization between switching unit controllers 12 and service providers 14, detect and identify the source of framing errors or other losses of synchronization between switching unit controllers 12 and service providers 14, and respond to any such errors to help protect switching unit 10 and data associated with switching unit 10 from undesirable consequences that might otherwise result from the errors. A single frame includes a specified number of time slots corresponding, in one embodiment, to the number of ports associated with switching unit 10 or an appropriate subset of that number. For example, in a particular embodiment, although the present invention contemplates any suitable number of time slots in each frame, switching unit 10 supports 16,384 ports and each frame may include 4,096, 3,072, or 2,048 time slots depending on a selected operating mode. A framing error resulting from total or partial loss of frame synchronization may include the occurrence of two or more overlapping frames, one or more shifted frames, misalignment of some or all time slots within one or more frames, loss of one or more frames, or any other framing errors. Those skilled in the art will appreciate that the present invention encompasses all such framing errors, whether associated with switching unit 10 or any other appropriate telecommunications device incorporating the present invention.

Redundant synchronization buses 16 may be referred to, where appropriate, as "A" synchronization bus 16 and "B" synchronization bus 16. Although redundant "A" and "B" synchronization buses 16 and redundant switching unit controllers 12a and 12b are discussed, the present invention contemplates a single synchronization bus 16 and a single switching unit controller 12 providing some or all of the described functionality. Switching unit controller 12a, switching unit controller 12b, and each service provider 14 are coupled to "A" synchronization bus 16 using associated bus interface modules (BIM) 50a and associated links 52a. Similarly, switching unit controller 12a, switching unit controller 12b, and each service provider 14 are coupled to "B" synchronization bus 16 using associated bus interface modules 50b and associated links 52b. Bus interface module 50a of switching unit controller 12a receives "A" frame pulses from associated frame pulse generator (GEN) 54 and communicates "A" frame pulses to bus interface modules 50a of switching unit controller 12b and service providers 14 using links 52a and "A" synchronization bus 16. Similarly, bus interface module 50b of switching unit controller 12b receives "B" frame pulses from associated frame pulse generator 54 and communicates the "B" frame pulses to bus interface modules 50b of switching unit controller 12a and service providers 14 using links 52b and "B" synchronization bus 16. Arrowheads associated with links 52a and 52b in FIG. 2 indicate the direction of transmission paths for "A" and "B" frame pulses, respectively. The present invention contemplates any suitable combination of hardware and software to replace or cooperate with bus interface modules 50a and 50b to provide the described interface functionality with respect to "A" and "B" synchronization buses 16, respectively.

Generator 54 within each switching unit controller 12 and service provider 14 generates frame pulses according to an associated time slot counter 56. In a particular embodiment, time slot counter 56 may use a 32 MHz count increment and count 4,096 time slots for each 125 µs frame, may use a 24 MHz count increment and count 3,072 time slots for each 125 µs frame, or may use a 16 MHz count increment and count 2,048 time slots for each 125 µs frame, depending on an a selected operating mode, the number of ports associated with switching unit 10, and any other suitable factors. After counting the appropriate number of time slots for a particular frame, 4,096 for example, time slot counter 56 resets and begins counting time slots for the next frame. Time slot counter 56 may rely, at least in part, on input from a system clock associated with switching unit 10, a self-generated clock associated with the particular switching unit controller 12 or service provider 14 and synchronized with the system clock, or any other suitable clock. Suitable techniques for clock synchronization within a telecommunications device are described in U.S. Pat. No. 6,631,483. Generator 54 of switching unit controller 12a generates "A" frame pulses, generator 54 of switching unit controller 12b generates "B" frame pulses, and generators 54 of service providers 14 each generate internal frame pulses that are used internal to service providers 14 to support associated switching functionality.

Figure 3:
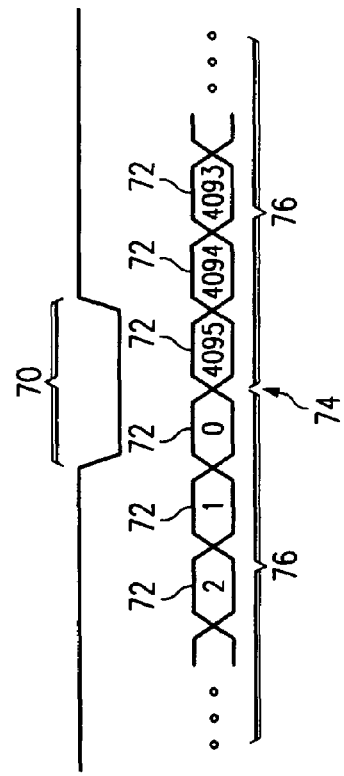
FIG. 3 is a flow chart that illustrates an example method of protecting the operation of a switching unit from loss of frame synchronization in accordance with the present invention.

In one embodiment, as illustrated in FIG. 3, each frame pulse 70 includes a specified number of time slots 72 spanning a junction 74 between adjacent frames 76. For example and not by way of limitation, for a particular embodiment in which each frame 76 includes 4,096 time slots, a two time slot frame pulse 70 may contain "4,095" time slot 72 for a first frame 76 cross-coupled with "0" time slot 72 for an adjacent second frame 76. A four time slot frame pulse 70 might also include "4,094" time slot 72 for first frame 76 and "1" time slot 72 for second frame 76. A six time slot frame pulse 70 might further include "4,093" time slot 72 for first frame 76 and "2" time slot 72 for second frame 76. The present invention contemplates frame pulse 70 being asymmetrical about junction 74. Frame pulses 70 provide a precise indication of the beginning and ending of each frame 76, desirable for purposes of synchronization and proper time slot alignment, without requiring components of switching unit 10 to use additional resources required to generate, transmit, receive, and evaluate information associated with additional time slots 72 within frames 76. Frame pulses 70 and frames 76 may be in any appropriate form, have any suitable length, and contain any suitable number of time slots 72, according to particular needs.

Referring again to FIG. 2, in one embodiment switching unit controllers 12 and service providers 14 each include an application specific integrated circuit (ASIC) complex 58 that: (1) provides some or all functionality of bus interface modules 50a and 50b, generator 54, and time slot counter 56; and (2) is responsible for controlling some or all operations of switching unit controller 12 or service provider 14 with respect to frame synchronization and associated error detection and fault protection, among other responsibilities. ASIC complex 58 may include one or more ASIC devices that each provide the same, partially overlapping, or different functionality than one or more other ASIC devices in ASIC complex 58. In a particular embodiment, each switching unit controller 12 supports a single ASIC device within ASIC complex 58 and each service provider 14 supports as many as five ASIC devices within ASIC complex 58, depending in general on the number of ports associated with switching unit 10 and other suitable factors. Suitable ASIC complexes 58 and associated ASIC devices are described more fully in U.S. Pat. No. 6,587,461. Although ASIC complexes 58 are discussed, any suitable combination of hardware and software may replace or cooperate with one or more ASIC complexes 58 to provide frame synchronization, error detection, and fault protection within switching unit 10 according to the present invention. For example, in one embodiment, CPU 36 and associated software cooperate with ASIC complex 58 to facilitate operation of the present invention in switching unit 10.

Before or during initialization of switching unit 10, software within or otherwise associated with switching unit 10, software running on CPU 36 for example, designates one switching unit controller 12a or 12b as master and, either directly or as a result of designating the master, designates the other switching unit controller 12b or 12a as the slave. Designation of the master may be performed essentially at random, according to one or more specified criteria, or in any other manner. Software may select and then command one switching unit controller 12a or 12b to operate in "generate" mode to designate the selected switching unit controller 12a or 12b as the master. Software may command the non-selected switching unit controller 12b or 12a to operate in "hunt, lock, and monitor" mode to designate the non-selected switching unit controller 12b or 12a as the slave. Software may also command service providers 14 to operate in "hunt, lock, and monitor" mode, as discussed more fully below. Generate mode, hunt, lock, and monitor mode, and associated operation of switching unit controllers 12 are described below. In another embodiment, CPU 36 commands the master to begin operating in generate mode and the master commands the slave and all service providers 14, using control bus 20, to begin operating in hunt, lock, and monitor mode.

In response to selection of the master and the command to operate in generate mode, the master, switching unit controller 12a as an example, begins to generate "A" frame pulses 70 using frame pulse generator 54 and to communicate "A" frame pulses 70 to switching unit controller 12b and service providers 14 using "A" synchronization bus 16. Essentially simultaneously and in response to the command to operate in hunt, lock, and monitor mode, the slave, switching unit controller 12b in this particular example, similarly begins to generate "B" frame pulses 70 using generator 54 and to communicate "B" frame pulses 70 to switching unit controller 12a and service providers 14 using "B" synchronization bus 16. As a result of the command to operate in hunt, lock, and monitor mode, the slave knows it is to synchronize with the master, which in one embodiment means synchronizing, with respect to phase, frequency, and any other suitable characteristics, "B" frame pulses 70 the slave generates with "A" frame pulses 70 the slave receives from the master.

Operating in hunt, lock, and monitor mode as commanded, the slave uses bus interface module 50a to hunt for, detect, or otherwise receive "A" frame pulses 70 from the master. To synchronize with "A" frame pulses 70, and therefore with the master itself, the slave resets time slot counter 56 according to the timing of the received "A" frame pulses 70 and begins to generate "B" frame pulses 70 in lockstep or otherwise synchronized with the received "A" frame pulses 70. In one embodiment, to validate frame synchronization with the master, the slave compares "B" frame pulses 70 with received "A" frame pulses 70 for a specified number of frame cycles, for example only and without limitation, eight frame cycles. If the slave is unable to validate its frame synchronization with the master for the specified number of frame cycles, meaning that "B" frame pulses 70 the slave is generating are not adequately synchronized with "A" frame pulses 70 the slave is receiving from the master, the slave begins to hunt for "A" frame pulses 70 again and the process repeats as described above. In one embodiment, the slave reports to CPU 36 its inability to validate synchronization and, in response, CPU 36 commands the slave to again hunt for "A" frame pulses 70.

After frame synchronization has been validated, the slave is considered locked with the master and is no longer directly dependent on "A" frame pulses 70 from the master for frame synchronization. The slave begins to monitor "A" frame pulses 70 for synchronization while continuing to independently generate and drive "B" frame pulses 70. The slave may report to CPU 36, to the master, or to both that it is locked on and monitoring "A" frame pulses 70. In monitoring "A" frame pulses 70, the slave loops or otherwise counts through the appropriate number of time slots 72 for each frame 76, which as discussed above in a particular embodiment may be 4,096, 3,072, or 2,048 time slots 72 depending on the operating mode. At the end of each such loop, the slave determines a synchronization status of "B" frame pulses 70 with respect to "A" frame pulses 70 and resets its time slot counter 56. In one embodiment, the slave reports the status to CPU 36 and CPU 36 reports the status to the master, either after each frame or in any other suitable manner, although the present invention contemplates the slave reporting the status directly to the master using control bus 20. The slave maintains its internal count regardless of the status, such that the slave maintains its synchronization with service providers 14 if the master, rather than the slave, is responsible for the loss of synchronization between the master and the slave.

If the slave remains locked with the master, meaning that the slave continues to generate "B" frame pulses 70 that are properly synchronized with "A" frame pulses 70 received from the master, the status is "synch" and both master and slave continue to independently generate and drive "A" and "B" frame pulses 70, respectively. However, if the slave loses synchronization with the master, indicating a framing error resulting from a failure or other error condition associated with either the master or the slave, the status is "loss of synch." To conserve resources within switching unit 10, the present invention contemplates reporting "loss of synch" status upon detecting a framing error or other loss of synchronization but not reporting "synch" status when no framing error or other loss of synchronization is detected. Analogous to the slave monitoring and reporting on its frame synchronization with the master, the master monitors and reports on its frame synchronization with the slave. In one embodiment, the master reports the status to CPU 36 and CPU 36 reports the status to the slave, after each frame or in any other suitable manner, although the master may report the status directly to the slave using control bus 20. The master maintains its internal count regardless of the status, such that the master will maintain its synchronization with service providers 14 if the slave, rather than the master, is responsible for the loss of synchronization between the master and the slave.

As described below, the master, the slave, and one or more service providers 14 cooperate to detect a framing error or other loss of synchronization, to identify the source of the error—either the master, the slave, or a particular service provider 14–and to respond to the error in a manner that allows switching unit 10 to continue to operate uninterrupted, despite the associated failure.

Service providers 14 receive the command from CPU 36 to begin operating in hunt, lock, and monitor mode and also receive the command to select either "A" frame pulses 70 from switching unit controller 12a or "B" frame pulses 70 from switching unit controller 12b. In response, generators 54 of service providers 14 begin generating internal frame pulses 70 and attempt to synchronize with the designated master. Each service provider 14 hunts, locks, and monitors with respect to "A" frame pulses 70 from the master in the manner described above with reference to the slave. Service provider 14 begins to hunt for, to detect, or to otherwise receive "A" frame pulses 70 from the master. To synchronize with "A" frame pulses 70, and therefore with the master itself, service provider 14 resets time slot counter 56 according to the timing of received "A" frame pulses 70 and begins to generate internal frame pulses 70 that are in lockstep or otherwise synchronized with the received "A" frame pulses 70. To validate its frame synchronization with the master, service provider 14 compares internal frame pulses 70 with received "A" frame pulses 70 for a specified number of frame cycles, eight frame cycles for example. If service provider 14 is unable to validate its synchronization with the master, service provider 14 enters hunt mode again, possibly after reporting to CPU 36 and receiving a corresponding command. After synchronization has been validated and service provider 14 is no longer directly dependent on "A" frame pulses 70 from the master for synchronization, service provider 14 begins monitoring "A" frame pulses 70 while continuing to generate internal frame pulses 70.

Together with or separate from the command to hunt, lock, and monitor with respect to the master, CPU 36 commands or service provider 14 otherwise knows to monitor "B" frame pulses 70 from the slave. Service provider 14 may report to CPU 36, to the master, or to both that it is monitoring "A" and "B" frame pulses 70. Service provider 14 loops or otherwise counts through the appropriate number of time slots 72 for each frame 76 and, at the end of each such loop, determines a synchronization status of internal frame pulses 70 with respect to "A" frame pulses 70 and with respect to "B" frame pulses 70 and resets time slot counter 56. Service provider 14 may report one or both statuses to CPU 36, or to the master and the slave, according to the statuses and particular needs. If service provider 14 remains locked and in synchronicity with both the master and the slave, meaning that service provider 14 continues to generate internal frame pulses 70 that are properly synchronized with both "A" frame pulses 70 from the master and "B" frame pulses from the slave, the status is "synch" with respect to both master and slave, and service provider 14 continues to independently generate and use its internal frame pulses 70.

However, if service provider 14 loses frame synchronization with the master or the slave, indicating one or more framing errors resulting from a failure or other error condition associated with either the master, the slave, or service provider 14, the status is "loss of synch" for at least one switching unit controller 12a or 12b. Service provider 14 reports to CPU 36, or to the master and the slave, at least the status corresponding to the switching unit controller 12a or 12b associated with the loss of synchronization. Service provider 14 maintains its internal count regardless of either status, such that it will maintain the integrity of its internal synchronization if the master or slave, rather than service provider 14, is responsible for the loss of synchronization between service provider 14 and the master or slave. In one embodiment, the cause of a framing error or other loss of synchronization detected at one or more service providers 14 may be in one of the following general categories: (1) a failure or other error condition associated with the master, (2) a failure or other error condition associated with the slave, or (3) a failure or other error condition associated with a particular service provider 14.

In the first possible case, a framing error is associated with "A" frame pulses 70 and has resulted from a failure of the master, which is switching unit controller 12a in this particular example. Since each service provider 14, in addition to switching unit controller 12b, monitors "A" frame pulses 70, each service provider 14 will detect the framing error and thus the failure essentially simultaneously. Each service provider 14 informs CPU 36 of the error with respect to "A" frame pulses 70 and CPU 36 informs both the master and the slave, although the present invention contemplates some or all service providers 14 informing the master and the slave directly using control bus 20. Although service provider 14 may be unable to independently determine whether the cause of the error is associated with the master or the service provider 14 itself, both the master and the slave become aware that multiple service providers 14 have reported the error since all or nearly all service providers 14 detect and report the error to CPU 36. As a result, whether or not the slave detects an error with respect to "A" frame pulses 70 as a result of its monitoring, which it likely will, the slave readily determines that the master has failed or is otherwise experiencing an error condition.

In one embodiment, the slave will report the failure of the master to CPU 36, switching unit controller 12b is designated the new master, and all service providers 14 are commanded to at least temporarily ignore "A" frame pulses 70 from switching unit controller 12a. If the master has not totally failed, it may be aware of its failure as a result of multiple error messages from service providers 14, independent of CPU 36 informing the master that it has failed. Under the control of CPU 36 and associated software, the master is then removed, disconnected, or otherwise electrically isolated from the slave, from service providers 14, and from any other suitable components of switching unit 10 until it can be replaced, repaired, or otherwise returned to service. A suitable isolation technique involving isolation bus 26 is described in U.S. Pat. No. 6,434,703, which is incorporated by reference herein. As discussed above, service providers 14 maintain their internal counts and continue to compare internal frame pulses 70 with "B" frame pulses from the new master without interruption or loss of data integrity. Significantly, according to the present invention, a failure of the master may be autonomously detected, its source readily identified, and responded to with little or no interruption to operations of switching unit 10, providing an important technical advantage over previous techniques.

In the second possible case, a framing error is associated with "B" frame pulses 70 and has resulted from failure of the slave, which is switching unit controller 12b in this particular example. Since each service provider 14, in addition to switching unit controller 12a, monitors "B" frame pulses 70, each service provider 14 will detect the framing error and thus the failure essentially simultaneously. Similar to the first case described above, each service provider 14 informs CPU 36 of the framing error with respect to "B" frame pulses 70 and CPU 36 will inform both the master and the slave, although the present invention contemplates some or all service providers 14 informing master and slave directly using control bus 20. Although service provider 14 may not be able to independently determine whether the cause of the framing error is the slave or, instead, service provider 14 itself, both the master and the slave become aware that multiple service providers 14 have reported the error since all or nearly all the service providers 14 will detect and report the error to CPU 36. As a result, whether or not the master detects an error with respect to "B" frame pulses 70 as a result of its monitoring, which it likely will, the master is able to readily determine that the slave has failed or is otherwise experiencing an error condition.

In one embodiment, the master will report the failure of the slave to CPU 36. Since the master has not failed, designation of a new master is unnecessary. Service providers 14 are instructed to at least temporarily ignore "B" frame pulses 70 from the slave. the slave has not totally failed, it may be aware of its failure as a result of multiple error messages from service providers 14, independent from CPU 36 informing the slave that it has failed. Under software control or in any other suitable manner, the slave is removed, disconnected, or otherwise electrically isolated from the master, from service providers 14, and from other suitable components of switching unit 10 until the slave can be replaced, repaired, or otherwise returned to service. As discussed above, service providers 14 maintain their internal counts and continue to compare internal frame pulses 70 with "A" frame pulses from the master without interruption or loss of data integrity. Significantly, as for failure of the master described above, failure of the slave may be autonomously detected, its source identified, and responded to with little or not interruption to operations of switching unit 10. Moreover, since service providers 14 continue to independently generate synchronized internal frame pulses 70, even if master and slave were to fail or otherwise be unavailable simultaneously, operation of service providers 14 is able to continue uninterrupted.

In the third possible case, the framing error is associated with internal frame pulses 70 generated in a particular service provider 14 and has resulted from failure of service provider 14. Since service provider 14 monitors both "A" and "B" frame pulses 70, service provider 14 detects loss of synchronization with respect to both "A" and "B" frame pulses 70 and reports the framing errors to CPU 36. In one embodiment, due to the relatively low likelihood that both the master and the slave have simultaneously failed, service provider 14 may independently recognize that service provider 14 itself has failed and, under software control or otherwise, remove, disconnect, or electrically isolate itself from switching unit controllers 12 and other service providers 14. While service provider 14 may not be able to independently determine whether the errors are associated with service provider 14 itself or with both the master and the slave, due to a total failure of service provider 14 or for any other reason, both the master and the slave readily identify service provider 14 as the source of the error since neither master nor slave becomes aware of multiple service providers 14 having reported the error. As for failure of the master or the slave described above, a failure of service provider 14 may be autonomously detected, its source identified, and responded to without interrupting operations of other components of switching unit 10.

The present invention allows the source of any framing error or other loss of synchronization to be identified based on "two out of three voting" between the master, the slave, and one or more service providers 14. If internal frame pulses 70 lose their synchronization with "A" frame pulses 70, but remain synchronized with "B" frame pulses 70, then the framing error is probably associated with the source of "A" frame pulses 70—switching unit controller 12a. Similarly, if internal frame pulses 70 lose synchronization with "B" frame pulses 70, but remain synchronized with "A" frame pulses 70, then the framing error is probably associated with the source of "B" frame pulses 70—switching unit controller 12b. Moreover, if internal frame pulses 70 for a particular service provider 14 lose synchronization with "A" and "B" frame pulses 70, then the error is probably associated with the source of internal frame pulses 70—the particular service provider 14. The present invention provides a number of important technical advantages over previous techniques that require each card in a system to synchronize itself with redundant reference signals for every frame, do not provide an internal frame pulse, do not identify the source of framing errors within the system, and cannot autonomously respond to such errors to allow the system to continue operating with little or no interruption. Previous techniques are inadequate and undesirable for incorporation within high availability backplane environments of switching and other modern telecommunications devices.

Figure 4A:
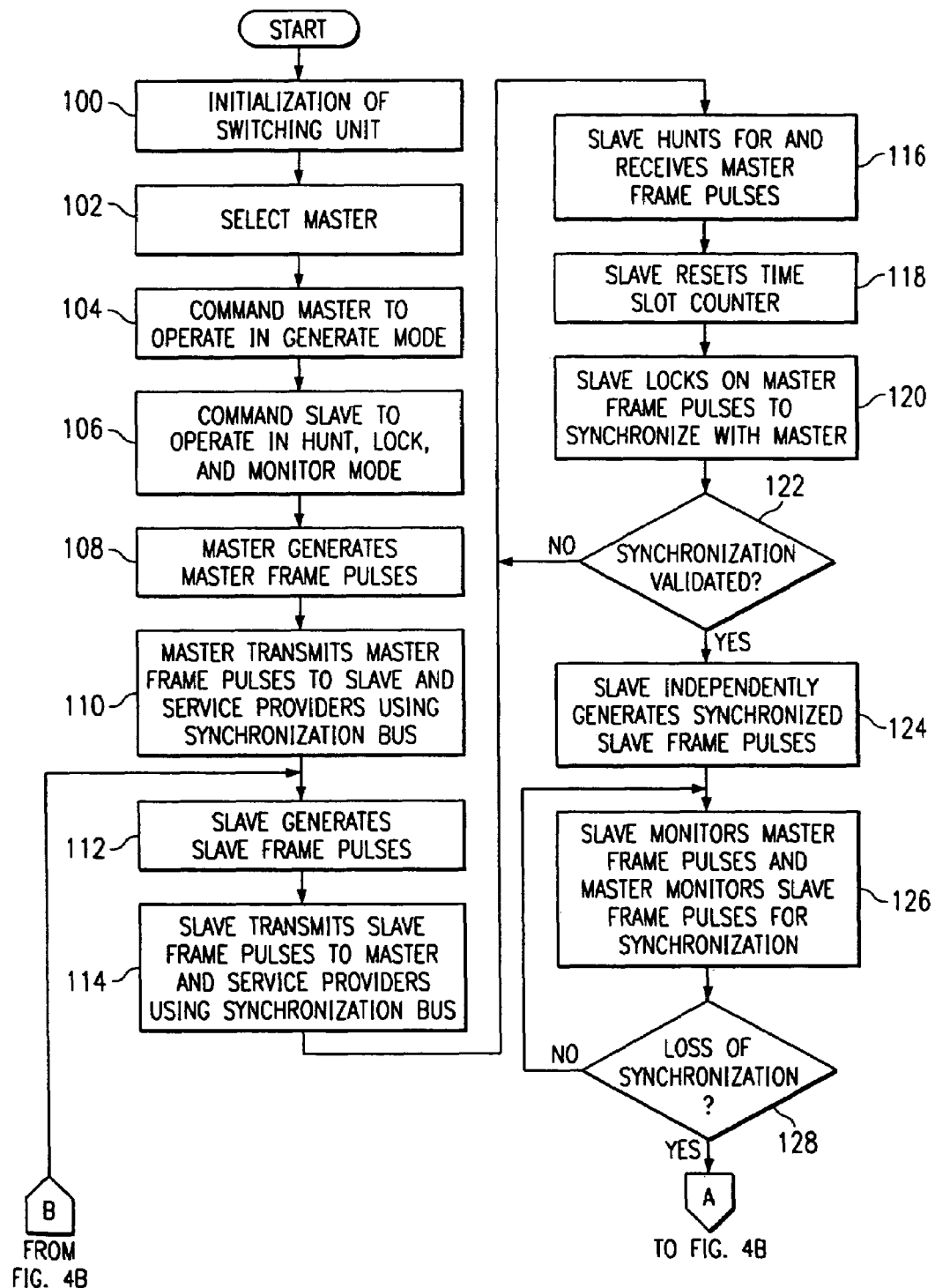

FIGS. 4A and 4B are a flow chart that illustrates an example method of providing frame synchronization and associated fault protection for redundant switching unit controllers 12a and 12b. The method begins at step 100, where switching unit 10 initializes. Before or during initialization of switching unit 10, software in or otherwise associated with switching unit 10, software running on CPU 36 for example, selects a switching unit controller 12a or 12b as master at step 102 and commands the master to begin operating in generate mode at step 104. At step 106, either directly or as a result of selecting the master, software identifies switching unit controller 12b or 12a as the slave and commands the slave to begin operating in hunt, lock, and monitor mode. In response to its selection as master and the command to operate in generate mode, the master, switching unit controller 12a for example, begins to generate "A" frame pulses 70 at step 108 and transmits "A" frame pulses 70 to the slave and service providers 14 at step 110 using synchronization bus 16. Essentially simultaneously, and in response to the command to operate in hunt, lock, and monitor mode, the slave, switching unit controller 12b in this example, similarly begins to generate "B" frame pulses 70 at step 112 and transmits "B" frame pulses 70 to the master and service providers 14 at step 114 using synchronization bus 16. Steps 104 through 114 may occur in any suitable order according to the operation of switching unit 10.

In response to the command to begin operating in hunt, lock, and monitor mode, the slave knows it is to synchronize with the master and uses bus interface module 50a to hunt for, detect, or otherwise receive the "A" frame pulses 70 from the master at step 116. To synchronize with the master, the slave resets time slot counter 56 according to the timing of received "A" frame pulses 70 at step 118 and begins generating "B" frame pulses 70 in lockstep or otherwise synchronized with received "A" frame pulses 70 at step 120. In one embodiment, to synchronize with the master, the slave compares "B" frame pulses 70 with received "A" frame pulses 70 for a specified number of frame cycles, eight frame cycles for example. If synchronization is suitably validated at step 122, such that the slave is generating "B" frame pulses 70 properly synchronized with "A" frame pulses 70 received from the master, the slave is locked with the master and continues independently generating synchronized "B" frame pulses 70 at step 124. If synchronization is not validated at step 122, such that the slave is unable to achieve synchronization with "A" frame pulses 70, the method returns to step 116 and the slave again hunts for "A" frame pulses 70.

At step 126, the slave monitors "A" frame pulses 70 for synchronization and the master monitors "B" frame pulses 70 for synchronization. Selected operations associated with such monitoring are described more fully below with reference to FIG. 6. If neither the master nor the slave detects a framing error or other loss of synchronization at step 128, the method returns to step 126 and both master and slave continue their monitoring of one another for synchronization. However, if a framing error or loss of synchronization has been detected at step 128 and the slave has failed or is otherwise experiencing an error condition at step 130, the master readily determines that the slave has failed at step 132. In one embodiment, the master determines failure of the slave based in part upon its own monitoring of "B" frame pulses 70 and based in part upon multiple service providers 14 reporting on their loss of synchronization with "B" frame pulses 70. The master maintains its internal count at step 134 despite the failure of the slave to maintain synchronization with service providers 14. Under software control or otherwise, autonomously in one embodiment, the slave is then removed, disconnected, or otherwise electrically isolated from the master and service providers 14 at step 136 until the slave can be replaced, repaired, or otherwise returned to service at step 138. When the slave is returned to service, the method returns to step 112, where the slave generates "B" frame pulses 70 for transmission to the master and service providers 14. The slave may receive another command to begin operating in hunt, lock, and monitor mode upon its return to service.

If a framing error or other loss of synchronization has been detected at step 128 and the slave has not failed at step 130, the slave readily determines that the master has failed at step 140. In one embodiment, the slave determines failure of the master based in part upon its own monitoring of "A" frame pulses 70 and based in part upon multiple service providers 14 reporting on their loss of synchronization with "A" frame pulses 70. The slave maintains its internal count at step 142 despite the failure of the master to maintain its synchronization with service providers 14. Under software control and autonomously in one embodiment, the master is removed, disconnected, or otherwise electrically isolated from the slave and service providers 14 at step 144. At step 146, CPU 36 and associated software select the slave to be the new master and command the new master to begin operating in generate mode, effectively initiating switchover of the primary synchronization reference from switching unit controller 12a to switching unit controller 12b.

The former master, switching unit controller 12a in this particular example, may be replaced, repaired, or otherwise returned to service as the slave at step 148. The method then returns to step 112 where the slave, switching unit controller 12a in this particular example, begins generating "A" frame pulses 70 for transmission to the master and service providers 14. The present invention contemplates reverting to selection of switching unit controller 12a as master, rather than as slave, following switching unit controller 12a returning to service at step 148, in which case the method returns to step 102. Since the method continues in this manner while switching unit 10 remains in operation, the operation of switching unit 10 remains protected from a failure or other error condition associated with either redundant switching unit controller 12a or 12b, helping to avoid a single point of failure, satisfy high availability requirements, and provide an important technical advantage.

Figure 5A:
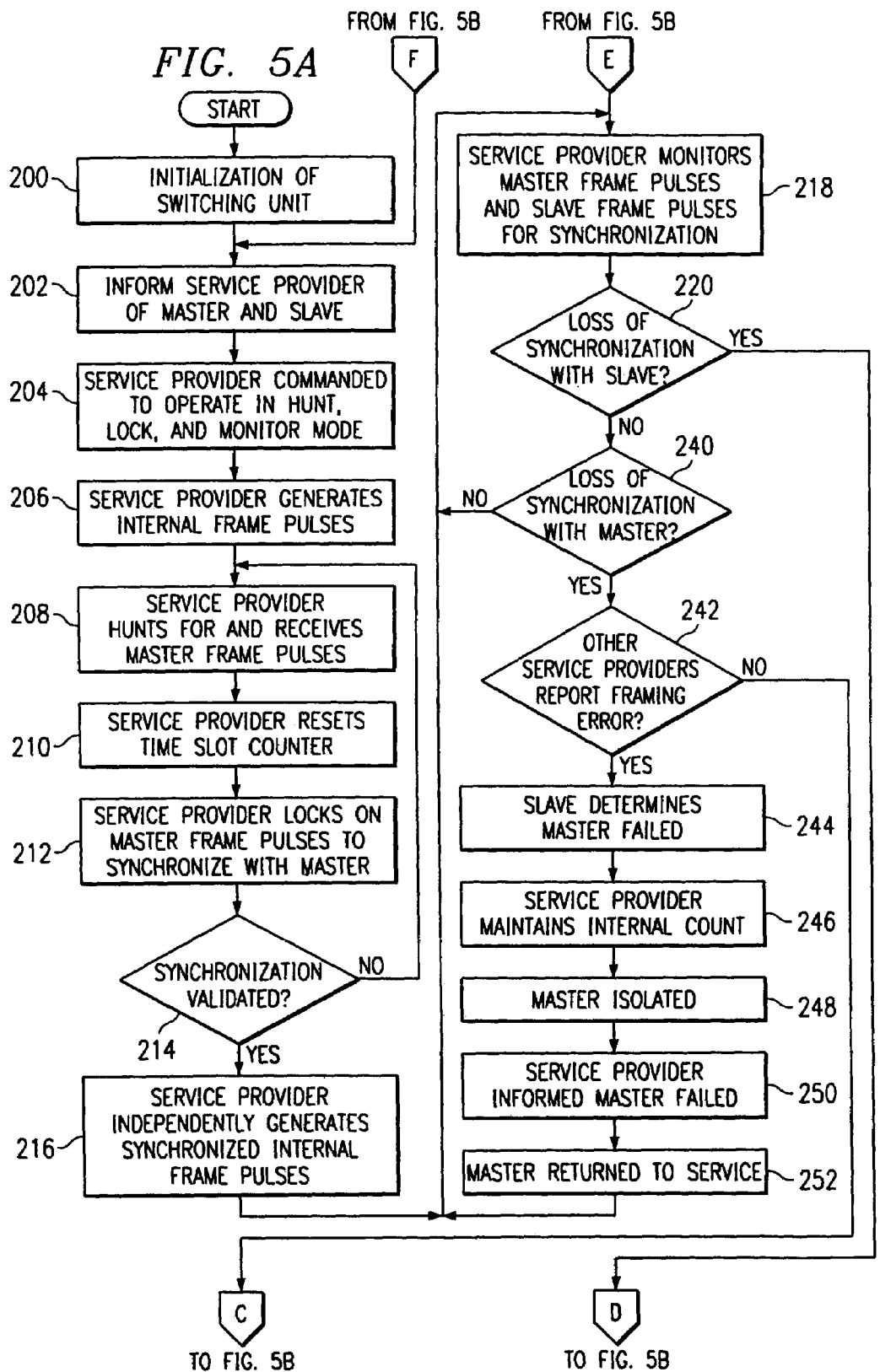
FIGS. 5A and 5B are a flow chart that illustrates an example method of providing frame synchronization and associated fault protection for a service provider according to the present invention.
Figure 5B:
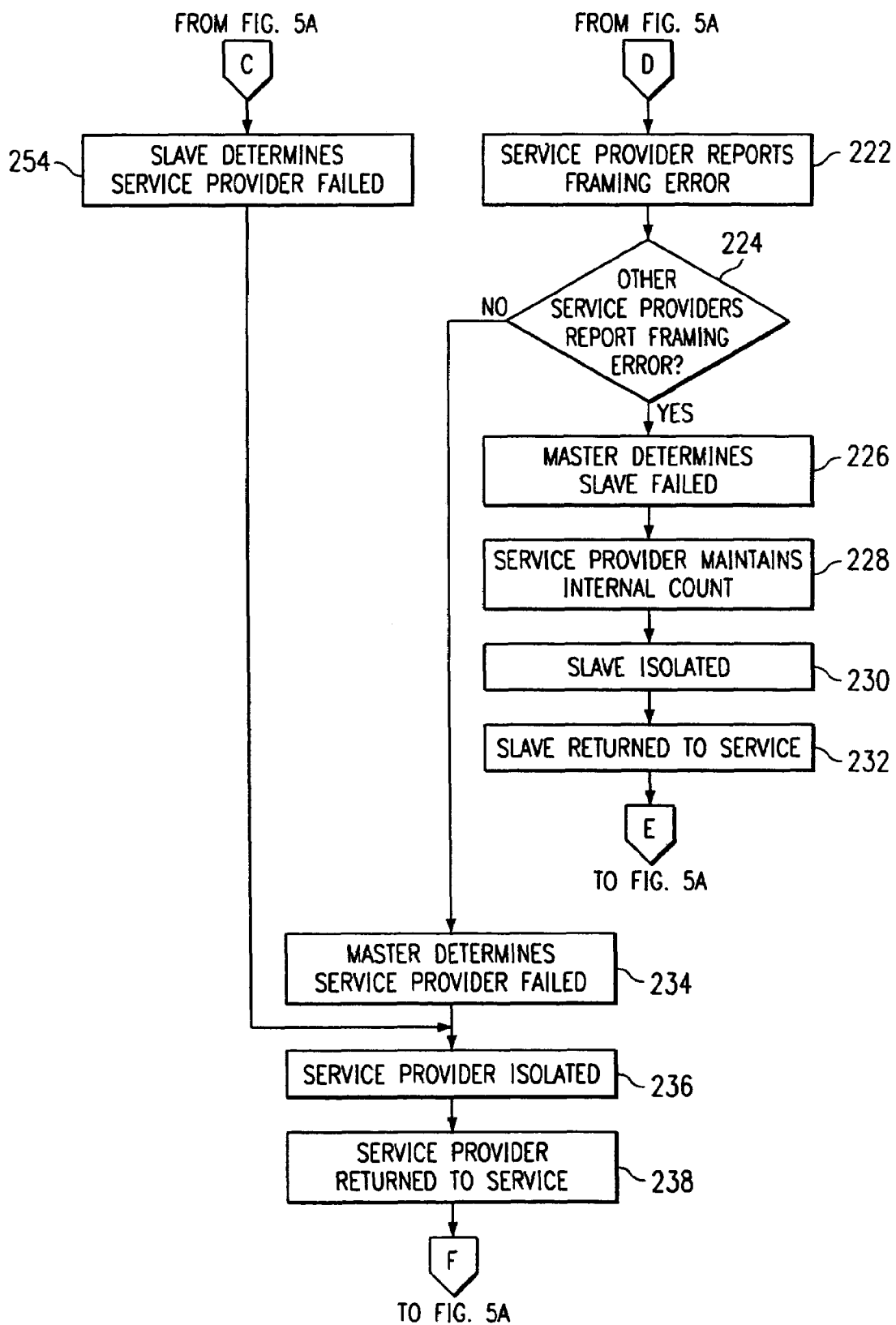

FIGS. 5A and 5B are a flow chart that illustrate an example method of providing frame synchronization and associated fault protection for a particular service provider 14 within switching unit 10. The method begins at step 200, where switching unit 10 initializes. At step 202, CPU 36 or the master informs service provider 14 that, in this example, switching unit controller 12a is the master and, directly or by default, switching unit controller 12b is the slave. CPU 36 commands service provider 14 to begin operating in hunt, lock, and monitor mode at step 204, service provider 14 begins generating internal frame pulses 70 at step 206, and service provider 14 begins to hunt for, detect, or otherwise receive "A" frame pulses 70 from the master at step 208. Step 206 may occur at any suitable time relative to steps 202, 204, and 208. To synchronize with the master, service provider 14 resets time slot counter 56 according to the timing of the received "A" frame pulses 70 at step 210 and begins generating internal frame pulses 70 in lockstep or otherwise synchronized with received "A" frame pulses 70 at step 212. If synchronization has not been suitably validated at step 214, the method returns to step 208, where service provider 14 again hunts for "A" frame pulses 70 from the master. However, if synchronization has been suitably validated at step 214, service provider 14 continues independently generating synchronized internal frame pulses 70 at step 216.

At step 218, service provider 14 monitors "A" and "B" frame pulses 70 from the master and slave, respectively, for synchronization. Selected operations associated with such monitoring are described more fully below with reference to FIG. 6. If the service provider 14 detects a framing error or other suitable loss of synchronization with the slave at step 220, service provider 14 reports the corresponding status to CPU 36 at step 222. If other service providers 14 within switching unit 10 have also reported the error at step 224, the master readily determines that the slave has failed or otherwise experienced an error condition at step 226. In one embodiment, the master determines failure of the slave based in part upon its own monitoring of "B" frame pulses 70 and based in part upon multiple service providers 14 reporting their loss of synchronization with "B" frame pulses 70. Service provider 14 maintains its internal count at step 228 despite failure of the slave to maintain synchronization with the master.

Under software control or otherwise, the slave is then removed, disconnected, or otherwise electrically isolated from the master and service providers 14 at step 230 until the slave can be replaced, repaired, or otherwise suitably returned to service at step 232, at which point the method returns to step 218. If no other service providers 14 within switching unit 10 have also reported the error at step 224, the master readily determines that service provider 14 has failed or otherwise experienced an error condition at step 234. In one embodiment, the master determines failure of service provider 14 based in part upon its own monitoring of "B" frame pulses 70 and also in part upon some or all other service providers 14 not reporting a loss of synchronization with "B" frame pulses 70. Under software control or otherwise, autonomously in one embodiment, service provider 14 is removed, disconnected, or otherwise electrically isolated from master, slave, and other service providers 14 at step 236 until service provider 14 can be suitably returned to service at step 238, at which point the method returns to step 202.

If service provider 14 does not detect a loss of synchronization with the slave at step 220, but detects a framing error or other loss of synchronization with the master at step 240 and other service providers 14 have reported the error at step 242, the slave readily determines that the master has failed at step 244. In one embodiment, the slave determines failure of the master based in part upon its own monitoring of "A" frame pulses 70 and based in part upon multiple service providers 14 reporting their loss of synchronization with "A" frame pulses 70. Service provider 14 maintains its internal count at step 246, despite failure of the master, to maintain synchronization. At step 248, under software control or otherwise, the master is then removed, disconnected, or otherwise electrically isolated from the slave and from service providers 14. CPU 36 informs service provider 14 that the master has failed at step 250, prompting service provider 14 to at least temporarily ignore "A" frame pulses 70 from the former master in favor of "B" frame pulses 70 from the former slave, switching unit controller 12b in this example, now the new master.

The former master, switching unit controller 12a in this particular example, may be replaced, repaired, or otherwise returned to service at step 252 as the new slave. The method then returns to step 218, where service provider 14 again monitors "A" frame pulses from the slave. The present invention contemplates service provider 14 being commanded to or otherwise entering hunt, lock, and monitor mode with respect to "A" frame pulses 70 if switching unit 10 reverts to selection of switching unit controller 12a as the master following its return to service. If some or all other service providers 14 have not detected and reported to CPU 36 on the framing error at step 242, the slave readily determines that service provider 14 has failed or is otherwise experiencing an error condition at step 254, and the method proceeds to step 236 for isolation of service provider 14. In one embodiment, the slave determines the failure of service provider 14 based in part on its own monitoring of "A" frame pulses 70 and in part on some or all other service providers 14 not reporting loss of synchronization with "A" frame pulses 70. If service provider 14 does not detect either a loss of synchronization with the slave at step 220 or a loss of synchronization with the master at step 240, the method returns to step 218, where service provider 14 continues to monitor both "A" frame pulses 70 from the master and "B" frame pulses 70 from the slave for synchronization. Since the method continues in this manner while switching unit 10 is in operation, the operation of switching unit 10 is protected from a failure or other error condition associated with service provider 14, helping to avoid a single point of failure, satisfy high availability requirements, and provide an important technical advantage.

FIG. 6 is a flow chart that illustrates an example method of monitoring synchronization with a received frame pulse 70. The method may be performed at one or both switching unit controllers 12a and 12b at step 126 of FIG. 4. Where the method is performed at switching unit controller 12a, the received frame pulses 70 are "B" frame pulses 70 from switching unit controller 12b. Conversely, where the method is performed within switching unit controller 12b, the received frame pulses 70 are "A" frame pulses 70 from switching unit controller 12a. The method may be performed at service provider 14 at step 218 of FIG. 5, in which case received frame pulses 70 may include "A" frame pulses 70 from switching unit controller 12a, "B" frame pulses 70 from switching unit controller 12b, or both "A" and "B" frame pulses 70, depending on the failure status of one or both switching unit controllers 12a and 12b. The method begins at step 300, where an appropriate number of time slots 72 for each frame 76 are looped or counted through. At step 302, following each such loop, a synchronization status is determined with respect to received frame pulses 70. The status determined at step 302 may be "synch," "loss of synch," or any other suitable status. At step 304, the status is reported to CPU 36, the master, the slave, other service providers 14, or any other suitable components of switching unit 10, singly or in any suitable combination, directly or indirectly, and the method ends.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A telecommunications device, comprising:
a bus;
a first controller coupled to the bus and operable to generate first pulses for communication using the bus;
a second controller coupled to the bus and operable to generate second pulses synchronized with the first pulses for communication using the bus; and
a card coupled to the bus and operable to receive the first and second pulses, generate internal pulses synchronized with the first and second pulses, compare at least one internal pulse with at least one first pulse to detect a loss of synchronization, and indicate this loss of synchronization to allow the second controller to determine a failure of the first controller.

2. The device of claim 1, wherein the device is a switching unit having a high availability backplane environment, the first pulses are first frame pulses each comprising a plurality of first time slots, the second pulses are second frame pulses each comprising a plurality of second time slots, and the loss of synchronization is associated with a framing error.

3. The device of claim 1, wherein the card is further operable to compare a specified number of internal pulses with the specified number of first pulses to validate synchronization of the internal pulses with the first pulses.

4. The device of claim 1, wherein the second controller is further operable to:
compare at least one second pulse with at least one first pulse to detect a loss of synchronization between the second pulse and the first pulse;
determine the failure of the first controller in response to the detection in addition to the indication from the card.

5. The device of claim 1, wherein the card is further operable to:
compare at least one internal pulse with at least one second pulse to detect a loss of synchronization between the internal pulse and the second pulse;
indicate this loss of synchronization to allow the first controller to determine a failure of the second controller.

6. The device of claim 1, wherein the second controller is further operable to determine a failure of the card rather than a failure of the first controller in response to at least the indication from the card.

7. The device of claim 6, wherein the second controller determines the failure of the card only if the second controller does not detect a loss of synchronization between at least one second pulse and at least one first pulse.

8. The device of claim 1, further comprising at least a second card coupled to the bus and operable to receive the first and second pulses, generate second internal pulses synchronized with the first and second pulses, compare at least one second internal pulse with at least one first pulse to detect a loss of synchronization, and indicate this loss of synchronization to allow the second controller to determine the failure of the first controller.

9. The device of claim 1, wherein the card is further operable to continue generating internal pulses synchronized with the second pulses following the failure of the first controller.

10. The device of claim 1, wherein the card is further operable to continue generating synchronized internal pulses following the failure of the first controller and a contemporaneous failure of the second controller, operation of the card continuing uninterrupted despite the failures.

11. A card for operation in a telecommunications device, the device comprising a bus operable to transmit first pulses from a first controller and second pulses from a second controller synchronized with the first pulses, wherein:
the card is coupled to the bus;
the card is operable to receive the first and second pulses;
the card is operable to generate internal pulses synchronized with the first and second pulses;
the card is operable to compare at least one internal pulse with at least one first pulse to detect a loss of synchronization; and
the card is operable to generate an indication of this loss of synchronization for communication to the second controller to allow the second controller to determine a failure of the first controller.

12. The card of claim 11, wherein the device is a switching unit with a high availability backplane environment, the first pulses are first frame pulses that each comprise a plurality of first time slots, the second pulses are second frame pulses that each comprise a plurality of second time slots, and the loss of synchronization is associated with a framing error.

13. The card of claim 11, wherein the card is further operable to:
compare a specified number of internal pulses with the specified number of first pulses; and
validate synchronization of the internal pulses with the first pulses according to the comparison.

14. The card of claim 11, wherein the card is further operable to:
compare at least one internal pulse with at least one second pulse to detect a loss of synchronization; and
generate an indication of this loss of synchronization for communication to the first controller to allow the first controller to determine a failure of the second controller.

15. The card of claim 11, wherein the card has experienced a failure and generates the indication in response to the failure, the second controller determining a failure of the card rather than a failure of the first controller in response to at least the indication from the card.

16. The card of claim 11, wherein the card is one of a plurality of cards each coupled to the bus and operable to receive the first and second pulses, generate internal pulses synchronized with the first and second pulses, compare at least one internal pulse with at least one first pulse to detect a loss of synchronization, and indicate this loss of synchronization to allow the second controller to determine the failure of the first controller.

17. The card of claim 11, wherein the card is operable to continue generating internal pulses synchronized with the second pulses following the failure of the first controller.

18. The card of claim 11, wherein the card is operable to continue generating synchronized internal pulses following the failure of the first controller and a failure of the second controller contemporaneous with the failure of the first controller, operation of the card continuing uninterrupted despite the failures.

19. A method of protecting operation of a telecommunications device, comprising:
  generating first pulses at a first controller coupled to a bus;
  communicating the first pulses using the bus;
  generating second pulses synchronized with the first pulses at a second controller coupled to the bus;
  communicating the second pulses using the bus;
  receiving the first and second pulses at a card coupled to the bus;
  generating internal pulses synchronized with the first and second pulses at the card;
  comparing at least one internal pulse with at least one first pulse at the card to detect a loss of synchronization;
  indicating this loss of synchronization at the card; and
  determining at the second controller a failure of the first controller.

20. The method of claim 19, wherein the device is a switching unit having a high availability backplane environment, the first pulses are first frame pulses each comprising a plurality of first time slots, the second pulses are second frame pulses each comprising a plurality of second time slots, and the loss of synchronization is associated with a framing error.

21. The method of claim 19, further comprising:
  comparing at the card a specified number of internal pulses with the specified number of first pulses; and
  validating synchronization of the internal pulses with the first pulses according to the comparison.

22. The method of claim 19, further comprising:
  comparing at least one second pulse with at least one first pulse at the second controller to detect a loss of synchronization between the second pulse and the first pulse;
  determining at the second controller the failure of the first controller in response to the detection in addition to the indication from the card.

23. The method of claim 19, further comprising:
  comparing at least one internal pulse with at least one second pulse at the card to detect a loss of synchronization;
  indicating this loss of synchronization at the card; and
  determining at the first controller a failure of the second controller.

24. The method of claim 19, further comprising determining a failure of the card rather than a failure of the first controller in response to at least the indication from the card.

25. The method of claim 24, further comprising determining the failure of the card at the second controller only if the second controller does not detect a loss of synchronization between at least one second pulse and at least one first pulse.

26. The method of claim 19, further comprising:
  receiving the first and second pulses at a second card coupled to the bus;
  generating second internal pulses at the second card synchronized with the first and second pulses;
  comparing at least one second internal pulse with at least one first pulse at the second card to detect a loss of synchronization;
  indicating this loss of synchronization at the second card; and
  determining at the second controller the failure of the first controller.

27. The method of claim 19, further comprising continuing to generate at the card internal pulses synchronized with the second pulses following the failure of the first controller.

28. The method of claim 19, further comprising:
  continuing to generate at the card synchronized internal pulses following the failure of the first controller and a contemporaneous failure of the second controller; and
  continuing operation of the card uninterrupted despite the failures.

29. A system of protecting operation of a telecommunications device, comprising:
  means for generating first pulses at a first controller coupled to a bus;
  means for communicating the first pulses using the bus;
  means for generating second pulses synchronized with the first pulses at a second controller coupled to the bus;
  means for communicating the second pulses using the bus;
  means for receiving the first and second pulses at a card coupled to the bus;
  means for generating internal pulses synchronized with the first and second pulses at the card;
  means for comparing at least one internal pulse with at least one first pulse at the card to detect a loss of synchronization;
  means for indicating this loss of synchronization at the card; and
  means for determining at the second controller a failure of the first controller.

* * * * *